US009811605B2

(12) United States Patent
Sabbouh

(10) Patent No.: US 9,811,605 B2
(45) Date of Patent: *Nov. 7, 2017

(54) METHODS, APPARATUSES AND COMPUTER PROGRAM PRODUCTS FOR AUTOMATED LEARNING OF DATA MODELS

(71) Applicant: HERE Global B.V., Eindhoven (NL)

(72) Inventor: Marwan Badawi Sabbouh, Chelmsford, MA (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/154,176

(22) Filed: May 13, 2016

(65) Prior Publication Data

US 2016/0255093 A1  Sep. 1, 2016

Related U.S. Application Data

(63) Continuation of application No. 14/194,165, filed on Feb. 28, 2014, now Pat. No. 9,454,620.

(51) Int. Cl.
*G06F 9/44* (2006.01)
*G06F 17/30* (2006.01)
(Continued)

(52) U.S. Cl.
CPC .......... *G06F 17/30911* (2013.01); *G06F 8/10* (2013.01); *G06F 8/20* (2013.01);
(Continued)

(58) Field of Classification Search
None
See application file for complete search history.

(56) References Cited

U.S. PATENT DOCUMENTS 5,535,375 A   7/1996  Eshel et al.
5,742,818 A   4/1998  Shoroff et al.
(Continued)

FOREIGN PATENT DOCUMENTS

WO   WO 2014/202323 A1   12/2014

OTHER PUBLICATIONS

"Definition for index", Dictionary.com, Jan. 19, 2013.
(Continued)

*Primary Examiner* — Daxin Wu
(74) *Attorney, Agent, or Firm* — Alston & Bird LLP

(57) ABSTRACT

An apparatus includes a processor and memory storing executable computer program code causing the apparatus to at least receive requests from communication devices or applications, a request of the requests associated with requester credentials; analyze instances of data of the requests based at least in part on a comparison of the requester credentials and credentials of a creator of the instances of data; generate an index based at least in part on the analysis of the instances of data of the requests, wherein the index comprises an instance of type access control determined based at least in part on the comparison; and automatically generate a data model, in a development environment, based at least in part on data in the index, the data model comprises definitions defining access control for instances of data designated for validation of received instances of data. Corresponding methods and computer program products are also provided.

20 Claims, 14 Drawing Sheets

(51) Int. Cl.
*G06F 21/62* (2013.01)
*H04L 29/06* (2006.01)

(52) U.S. Cl.
CPC .... *G06F 17/30321* (2013.01); *G06F 21/6218* (2013.01); *H04L 63/102* (2013.01); *H04L 63/104* (2013.01)

(56) References Cited

U.S. PATENT DOCUMENTS

| | | | |
|---|---|---|---|
| 5,911,776 | A | 6/1999 | Guck |
| 6,393,442 | B1 | 5/2002 | Cromarty et al. |
| 6,529,936 | B1 | 3/2003 | Mayo et al. |
| 6,549,918 | B1 | 4/2003 | Probert, Jr. et al. |
| 6,721,747 | B2 | 4/2004 | Lipkin |
| 7,281,018 | B1 | 10/2007 | Begun et al. |
| 7,774,388 | B1 | 8/2010 | Runchey |
| 8,433,687 | B1 | 4/2013 | Pydi |
| 8,682,925 | B1 | 3/2014 | Marquardt et al. |
| 8,838,680 | B1 | 9/2014 | Jia |
| 8,880,464 | B1 | 11/2014 | Haeske et al. |
| 8,893,077 | B1 | 11/2014 | Aiuto et al. |
| 2002/0156866 | A1 | 10/2002 | Schneider |
| 2003/0023641 | A1 | 1/2003 | Gorman et al. |
| 2003/0070142 | A1 | 4/2003 | Drake et al. |
| 2003/0172113 | A1 | 9/2003 | Cameron et al. |
| 2005/0188353 | A1 | 8/2005 | Hasson et al. |
| 2005/0204051 | A1 | 9/2005 | Box et al. |
| 2005/0246193 | A1 | 11/2005 | Roever et al. |
| 2006/0036993 | A1* | 2/2006 | Buehler .............. G06F 17/3089 717/104 |
| 2006/0271603 | A1 | 11/2006 | Mathias |
| 2007/0130164 | A1 | 6/2007 | Kembel et al. |
| 2008/0027981 | A1 | 1/2008 | Wahl |
| 2008/0168420 | A1 | 7/2008 | Sabbouh |
| 2008/0183902 | A1 | 7/2008 | Cooper et al. |
| 2009/0132995 | A1 | 5/2009 | Iborra et al. |
| 2009/0157725 | A1 | 6/2009 | Zheng |
| 2010/0153862 | A1 | 6/2010 | Schreiber |
| 2010/0211572 | A1 | 8/2010 | Beyer et al. |
| 2011/0153630 | A1 | 6/2011 | Vernon et al. |
| 2012/0030187 | A1 | 2/2012 | Marano et al. |
| 2012/0041964 | A1 | 2/2012 | Kreiner et al. |
| 2012/0084750 | A1 | 4/2012 | Hardy et al. |
| 2012/0150989 | A1 | 6/2012 | Portnoy et al. |
| 2013/0054519 | A1 | 2/2013 | Ohno et al. |
| 2013/0055208 | A1 | 2/2013 | Murthy |
| 2013/0073400 | A1* | 3/2013 | Heath .................. G06Q 30/02 705/14.73 |
| 2013/0073632 | A1 | 3/2013 | Fedorov et al. |
| 2013/0080403 | A1 | 3/2013 | Yamakawa |
| 2013/0086100 | A1 | 4/2013 | de Cerqueira Gatti et al. |
| 2013/0097687 | A1 | 4/2013 | Storm |
| 2013/0132386 | A1 | 5/2013 | Runchey |
| 2013/0132840 | A1 | 5/2013 | Blas, Jr. et al. |
| 2013/0166568 | A1 | 6/2013 | Binkert et al. |
| 2013/0179545 | A1 | 7/2013 | Bishop |
| 2014/0036317 | A1 | 2/2014 | Krig et al. |
| 2014/0059017 | A1* | 2/2014 | Chaney .............. G06F 17/30595 707/692 |
| 2014/0059056 | A1* | 2/2014 | Chaney .............. G06F 17/30345 707/749 |
| 2014/0067866 | A1 | 3/2014 | Chen |
| 2014/0122422 | A1 | 5/2014 | Tzadikevitch et al. |
| 2014/0222890 | A1 | 8/2014 | Zhu et al. |
| 2014/0282393 | A1 | 9/2014 | Coalson |
| 2014/0310243 | A1 | 10/2014 | McGee et al. |
| 2014/0324751 | A1 | 10/2014 | Roberts et al. |
| 2014/0344781 | A1 | 11/2014 | Andres et al. |
| 2014/0379848 | A1 | 12/2014 | Sabbouh |
| 2014/0380273 | A1 | 12/2014 | Sabbouh |
| 2015/0170049 | A1* | 6/2015 | Mann .................. G06N 5/04 706/12 |
| 2015/0248277 | A1 | 9/2015 | Sabbouh |

OTHER PUBLICATIONS

"Use of Cardinality for JSON array attributes", Tom Rutt, Feb. 16, 2013.
Alexander, Keith, "RDF/JSON: A Specification for Serialising RDF in JSON", Proceedings of the 4th Workshop on Scripting for the Semantic Web, Jun. 2, 2008 (Jun. 2, 2008), XP002727873, Tenerife/Spain Retrieved from the Internet: URL:http://ceur-ws.org/Vol-368/paper16.pdf [retrieved on Jul. 29, 2014]; and Anonymous: "SFSW '08: Scripting for the Semantic Web", Internet Article, Retrieved from the Internet: URL:http://ceur-ws.org/Vol-368/ [retrieved on Jul. 29, 2014].
Aziz, Atif, et al., "An Introduction to JavaScript Object Notation (JSON) in JavaScript and .NET", Feb. 2007, 16 pages, retrieved from <http://msdn.microsoft.com/en-us/library/bb299886.aspx> on Aug. 25, 2014.
Bernstein et al., "Context-based prefetch—an optimization for implementing objects on relations", 2000.
Carvalho, "Comparative analysis of authentication schemes on a Java Card smart card", 2011.
Crockford et al., "The application/json Media Type for JavaScript Object Notation (JSON)", RFC 4627, 2006.
Decandia, Giuseppe, et al., "Dynamo: Amazon's Highly Available Key-Value Store", Proceedings of the ACM Symposium on Operating Systems Principles, Oct. 14-17, 2007, pp. 205-220, ACM, US.
Dictionary.com, definition of "model", Mar. 12, 2013.
Ecma International, "ECMAScript Language Specification", Standard ECMA-262, 2011.
Gill et al., "Impacts of data interchange formats on energy consumption and performance in Smartphones", 2011.
International Searching Authority, International Search Report and Written Opinion for International Application No. PCT/EP2014/060522, dated Aug. 12, 2014, 9 pages, European Patent Office, The Netherlands.
Juneau, et al., "The Definitive Guide to Jython Python for the Java Platform", 2010, Apress, 511 pages, USA.
Juneau, et al., "The Definitive Guide to Jython Python for the Java Platform", "Introduction to Pylons", Chapter 15, 2010, Apress, 20 pages, USA.
Kobylarz et al., "A Common Interface for Bluetooth-based Health Monitoring Devices", 2013.
Lanthaler, Markus, et al., "A Semantic Description Language for RESTful Data Services to Combat Semaphobia", Proceedings of the 5th IEEE International Conference on Digital Ecosystems and Technologies, May 31-Jun. 3, 2011, pp. 47-53, IEEE, Korea.
Lanthaler, Markus, et al., "On Using JSON-LD to Create Evolvable RESTful Services", Internet Article, Apr. 2012 (Apr. 2012), pp. 1-8, XP002727868, ISBN: 978-1-4503-1190-8, Retrieved from the Internet: URL:http://ws-rest.org/2012/proc/a4-2-lanthaler.pdf [retrieved on Jul. 29, 2014].
Merriam-Webster, "processor", 2014.
Ortega-Corral et al., "A 'Lighter' JSON for Message Exchange in Highly Resource Constrained Wireless Sensor Network Applications", 2012.
Rutt, Tom, "Use of Cardinality for JSON array attributes", Feb. 19, 2013, retrieved from <https://issues.oasis-open.org/browse/CAMP-52> on Dec. 5, 2015, 2 pages.
Rutt, Tom, "Use of Cardinality for JSON array attributes", Feb. 19, 2013, 5 pages, retrieved from <https://lists.oasis-open.org/archives/camp/201302/msg00077.html> on Dec. 1, 2014.
Shin, "Introduction to JSON (JavaScript Object Notation)", 2010.
Sollins, et al., "Functional Requirements for Uniform Resource Names", RFC 1737, Dec. 1994, 7 pages, retrieved from <https://www.ietf.org/rfc/rfc1737.txt> on Dec. 26, 2015, 7 pages.
U.S., Notice of Allowance for U.S. Appl. No. 14/194,165, dated Mar. 7, 2016, 9 pages, U.S.A.
U.S., Office Action for U.S. Appl. No. 14/194,165, dated Dec. 16, 2015, 18 pages, U.S.A.
U.S., Office Action for U.S. Appl. No. 14/194,165, dated Jul. 30, 2015, 20 pages, U.S.A.
Walsh, "What is JSON Schema?", 2010.

(56) References Cited

OTHER PUBLICATIONS

Walsh, David, "JSON Validation with JSON Schema", Nov. 23, 2010, 11 pages, retrieved from <http://davidwalsh.name/json-validation> on Aug. 25, 2014.

* cited by examiner

| property name | property datatype | Type | Index property |
|---|---|---|---|
| age | Integer | Person | No |
| gender | String | Person | Yes |

TABLE 1

FIG. 1.

```
[
  {
    "_uri": "Marwan/Marwan",
    "_type": "Person",
    "age": 25,
    "gender": "male"
  }
]
```

FIG. 5.

Request

URL: /sbe/v20/Marwan:Person

Verb: Post

Headers:

Authorization: Basic M2JmMDA5YmY5MTE4N2hhssaWY2MWM3Yz

User-id:cloudUser

Body:

```
{
  "_id": "marwan",
  "_type": "Person",
  "age": 25,
  "gender": "male"
}
```

FIG. 6.

| ts | ID | Type | Type owner | property | Value | datatyp e | Verb | Min Card | Max Card | en u m | red | app user | url | Headers |
|---|---|---|---|---|---|---|---|---|---|---|---|---|---|---|
| ts | Marwan | Person | HR | Age | [25] | integer | Post | | | | | HR cloudUser | /scbe/v20/... | Authorization... |
| ts | Marwan | Person | HR | Gender | [male] | string | Post | | | | | HR cloudUser | /scbe/v20/... | Authorization... |

TABLE 2

FIG. 7.

```
[
  {
    "_uri": "12345/:accessControl",
    "read": "private",
    "write":"private",
    "delete": "private"
  },
  {
    "read": "public",
    "write":" public",
    "delete": " public "
  },
  {
    "read": "group",
    "write":" group",
    "delete": "group"
  }
]
```

FIG. 8.

| ID | Type | Type-Source | property | Value | dtype | Min card | Enum | Max card | Verb |
|---|---|---|---|---|---|---|---|---|---|
| 12345 | accessControl | System | read | [private] | String | | [private, public, group] | 3 | Post |
| 12345 | accessControl | System | write | [private] | String | | [private, public, group] | 3 | Post |
| 12345 | accessControl | System | delete | [private] | String | | [private, public, group] | 3 | Post |
| 12345 | accessControl | System | read | [public] | String | | [private, public, group] | 3 | Post |
| 12345 | accessControl | System | write | [public] | String | | [private, public, group] | 3 | Post |
| 12345 | accessControl | System | delete | [public] | String | | [private, public, group] | 3 | Post |

TABLE 3

FIG. 9.

```
[{
  "_uri": "12345/:accessControl",
  "read": "",
  "write":"",
  "delete": ""
}]
```

FIG. 10.

| ID | Type | Property | Value | canType | Verb | ref | grp | user |
|---|---|---|---|---|---|---|---|---|
| 12345 | accessControl | read | [] | String | Post | | System | cloudUser |
| 12345 | accessControl | write | [] | String | Post | | System | cloudUser |
| 12345 | accessControl | delete | [] | String | Post | | System | cloudUser |

TABLE 4

FIG. 11.

```
[
  {
    "_uri": "Marwan/Marwan:Person",
    "age": 25,
    "gender": "male"
  },
  {
    "_uri": "Marwan/Marwan: accessControl",
    "read": "public",
    "write":"private",
    "delete": "private"
  }
]
```

FIG. 12.

| Id | Type owner | Type | property | Value | datatype | Min card | Max card | Verb | ref | App |
|---|---|---|---|---|---|---|---|---|---|---|
| Marwan/.. | Person | HR | Age | [25] | integer | | | Post | | HR |
| Marwan/.. | Person | HR | gender | [Male] | string | | | Post | | HR |
| Marwan/.. | Person | HR | Age | [25] | integer | | | Post | | HR |
| Marwan/.. | Person | HR | gender | [Male] | string | | | Post | | HR |
| Marwan/.. | access Control | System | read | [Public] | string | | | Post | | HR |
| Marwan/.. | access Control | System | write | [Private] | string | | | Post | | HR |
| Marwan/.. | access Control | System | delete | [Private] | string | | | Post | | HR |

TABLE 5

FIG. 13.

METHODS, APPARATUSES AND COMPUTER PROGRAM PRODUCTS FOR AUTOMATED LEARNING OF DATA MODELS

CROSS-REFERENCE TO RELATED APPLICATIONS

This patent application is a continuation of U.S. patent application Ser. No. 14/194,165, filed Feb. 28, 2014, which is incorporated herein by reference in its entirety.

TECHNOLOGICAL FIELD

An embodiment of the invention relates generally to cloud system management and, more particularly, relates to a method, apparatus, and computer program product for facilitating automated learning of a data model for usage in a cloud system.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to cloud systems which store and share data for consumers of the cloud system.

At present, when using a cloud system for the purpose of storing and sharing data, it is typically expected that the cloud system offer its consumers a common object model for serializing/de-serializing data of the consumers, a common serialization format, a common exchange document, a data modeling language for applications to model the data, Universal Resource Identifier (URI) conventions that describe the addressing of the data in the cloud system, and Rest application programming interfaces (APIs) for storing/modifying the data.

Currently, when using a cloud system for the purpose of storing and sharing data, applications may define their data type in a data model, and may then store instances of this type (also referred to herein as instances or instances of data) in the cloud. The cloud may use the data model to validate the instances. This validation mechanism may lead to improved data quality in the cloud.

In order to facilitate the creation of the data model, the cloud provider typically provides a development environment for application developers. This development environment is generally separate from a production environment and is used for the development of an application(s). Therefore, an application is typically first developed against the development environment, and after the application is tested, the application is deployed onto the production environment. Today, developing the application against the development environment generally first requires the creation of a data model. At present, the data model is typically further used by the production environment to validate instance data. Typically, the data model includes the following.

A type definition and the properties associated with the type. Additionally, the data model may also include access control configurations describing who may access the instances of the type. The various settings for access control typically include public, private, and group access control. In an instance in which public access control is specified in the data model, then everyone is able to retrieve/update/delete instances of the type defined in the data model. In an instance in which private access control is specified in the data model, then typically only the creator may retrieve/update/delete the instances. On the other hand, if group access control has been specified then typically only members of the group may retrieve/delete/update the instances.

The data model may also include indexing information that may govern the creation of indices of the instances of the type stored in the cloud. An index may be created in support for search operations. A typical index that is usually found in data models enables the querying of instances per user. For example, given the existence of such an index, a user of the system may ask the cloud to return all the data the user has created.

Currently, the need for the cloud to have the data model imposes an extra step that application developers need to perform in order to interact with the cloud. In turn, this typically requires that application developers to become familiar with the data modeling language that the cloud exposes. Oftentimes, this may result in significant developer overhead.

Typically, the creation of the data model requires weeks of a developer's time. Moreover, after the developer is finishing creating the data model, the data model is often reviewed by representatives from the cloud providers in order to catch any mistakes.

Current approaches to solving the problem are typically centered on having specialized tools that ease the creation of the data model. For example, application developers and product managers may use worksheets or spreadsheets to define their data models. An example worksheet is shown in table 1 of FIG. 1.

After the worksheet is generated, developers typically represent the generated data model using the data modeling language of the cloud service. Once the data model is checked by representatives of the cloud service, the data model may be loaded into the developer environment. Then, the developer may interact with the cloud to store/retrieve/update instances of the type.

While the use of the worksheet may enable non-engineers, such as for example, product managers to depict the data model, the use of the worksheet may not sufficiently alter the process needed to interact with the cloud environment. That is, the worksheet is simply a tool that facilitates the creation of the data model by non-technical users.

In view of the foregoing drawbacks, there may be a need to provide an efficient and reliable mechanism for facilitating automated learning of a data model for usage in cloud systems.

BRIEF SUMMARY

A method, apparatus and computer program product are therefore provided for facilitating automated learning of a data model for usage in a cloud system. In this regard, an example embodiment may.

An example embodiment may provide an approach that may alleviate the need for a developer to develop a data model within a development environment. Rather than developing the data model in a development environment, an example embodiment may utilize one or more Rest APIs interacting with the development environment in order to store data associated with the Rest API(s). In an instance in which an example embodiment determines that a sufficient sample of the data has been stored such as, for example, in a cloud system, a tool may be run or executed that analyzes the sample data stored which may be utilized in part to create the data model. Once the data model, such as, for example, a type, is created, an example embodiment may configure the development environment to validate instances of a type. At this point, the functioning of the development environment may be the same as that of the production environment.

In one example embodiment, a method for generating a data model is provided. The method may include receiving one or more requests from one or more communication devices or one or more applications. The method may further include analyzing one or more instances of data of the requests, in part, to generate at least one index. The method may further include automatically generating a data model, in a development environment, based at least in part on the data in the index. The data model may include one or more definitions defining valid types of instances of data designated for validation of one or more received instances of data.

In another example embodiment, an apparatus for generating a data model is provided. The apparatus may include a processor and at least one memory including computer program code. The memory and computer program code are configured to, with the processor, cause the apparatus to at least perform operations including receiving one or more requests from one or more communication devices or one or more applications. The memory and computer program code are also configured to, with the processor, cause the apparatus to analyze one or more instances of data of the requests, in part, to generate at least one index. The memory and computer program code are also configured to, with the processor, cause the apparatus to automatically generate a data model, in a development environment, based at least in part on the data in the index. The data model may include one or more definitions defining valid types of instances of data designated for validation of one or more received instances of data.

In another example embodiment, a computer program product for generating a data model is provided. The computer program product includes at least one computer-readable storage medium having computer-executable program code instructions stored therein. The computer-executable program code instructions may include program code instructions configured to receive one or more requests from one or more communication devices or one or more applications. The computer program product may further include program code instructions configured to analyze one or more instances of data of the requests, in part, to generate at least one index. The computer program product may further include program code instructions configured to automatically generate a data model, in a development environment, based at least in part on the data in the index. The data model may include one or more definitions defining valid types of instances of data designated for validation of one or more received instances of data.

BRIEF DESCRIPTION OF THE SEVERAL VIEWS OF THE DRAWINGS

Figure 2:
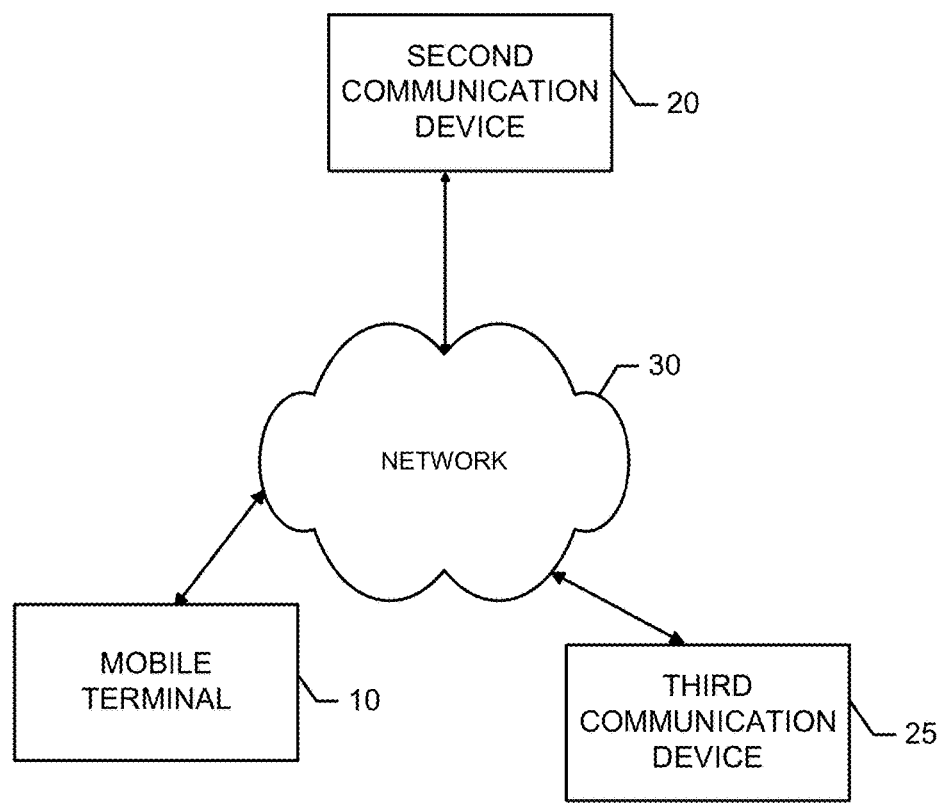
Figure 3:
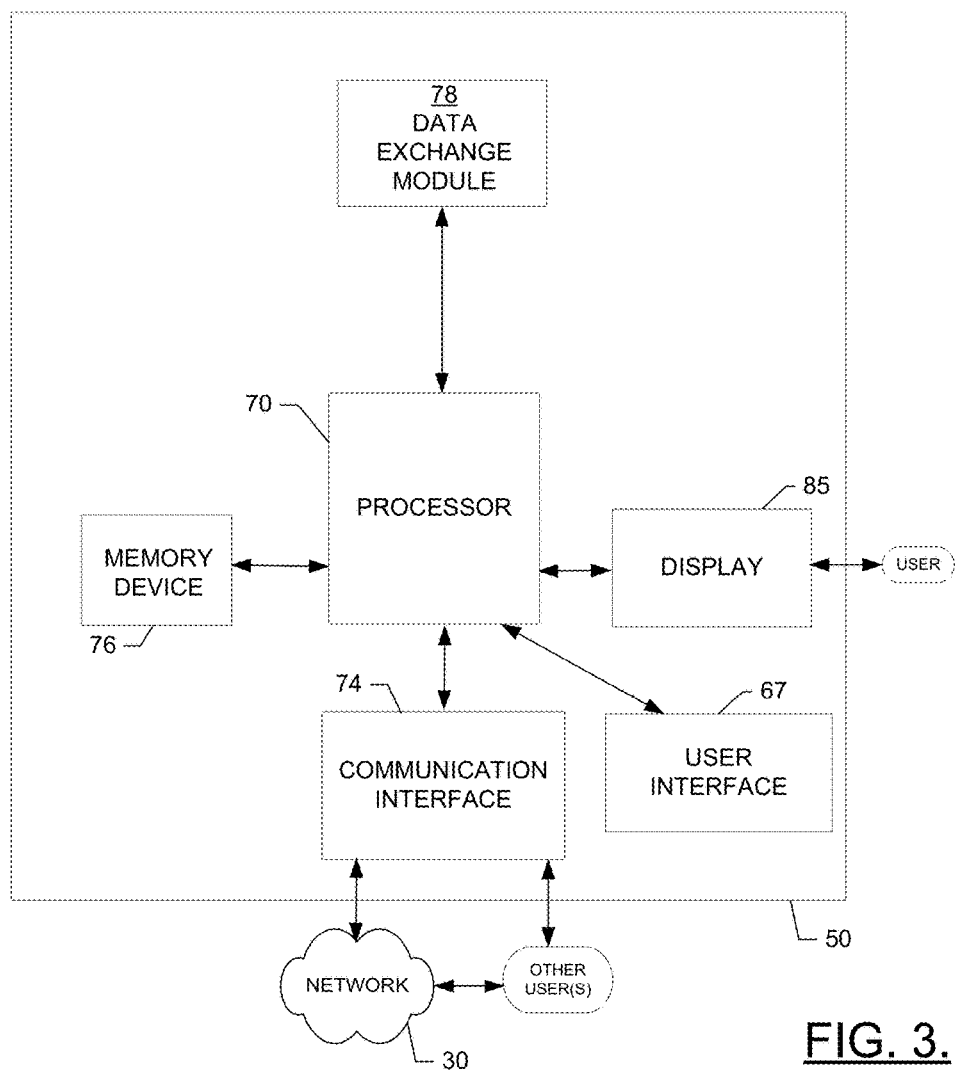
Figure 4:
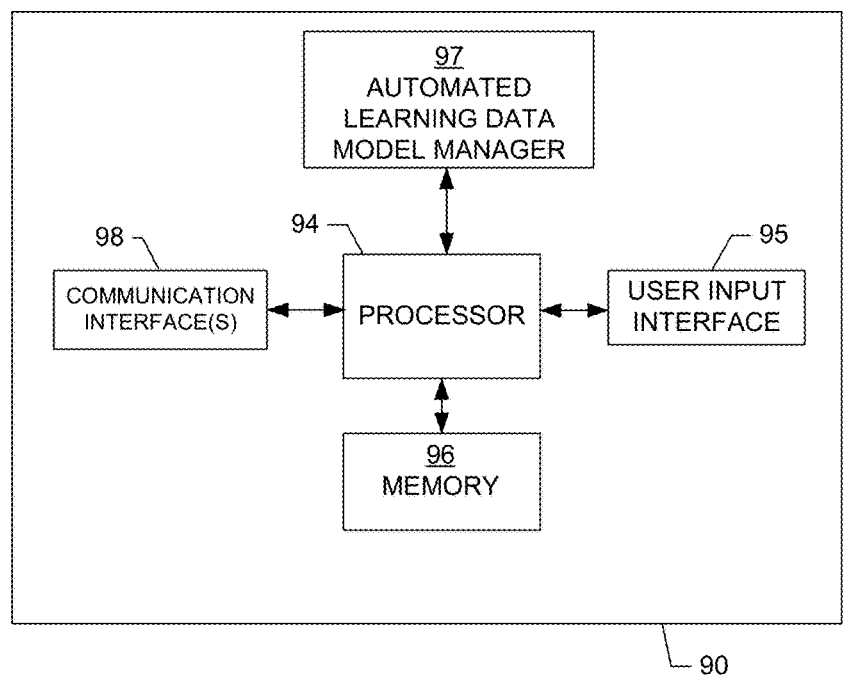
Figure 14:
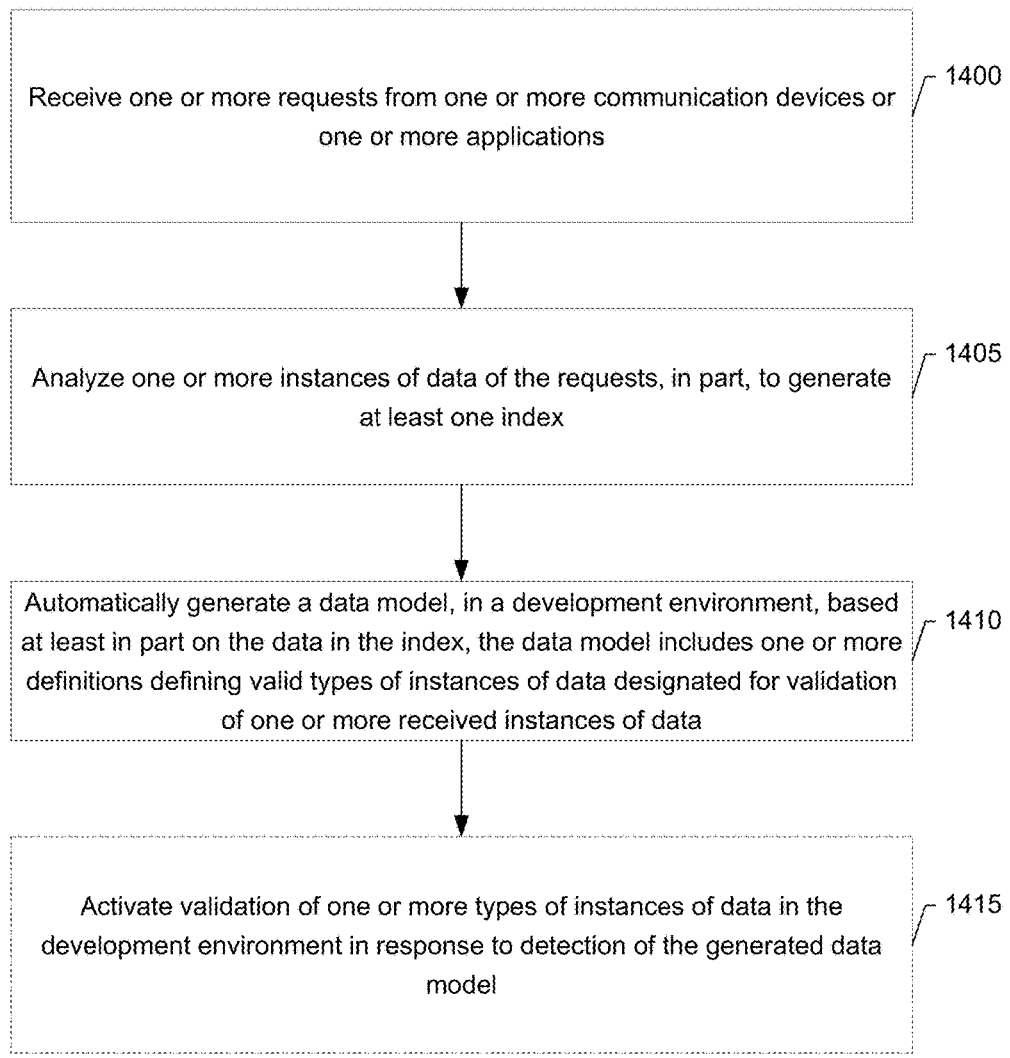

Having thus described some embodiments of the invention in general terms, reference will now be made to the accompanying drawings, which are not necessarily drawn to scale, and wherein:

FIG. 1 is a diagram of a worksheet describing type Person;

FIG. 2 is a schematic block diagram of a system according to an example embodiment of the invention;

FIG. 3 is a schematic block diagram of an apparatus according to an example embodiment of the invention;

FIG. 4 is a diagram of a network device according to an example embodiment of the invention;

FIG. 5 is a diagram of an instance of type person according to an example embodiment of the invention;

FIG. 6 is a diagram of a request according to an example embodiment of the invention;

FIG. 7 is a diagram of a table of an index associated with a request according to an example embodiment of the invention;

FIG. 8 is a diagram of an instance used to define an accessControl type according to an example embodiment of the invention;

FIG. 9 is a diagram of a table of an index with accessControl and cardinality/enumeration constraints according to an example embodiment of the invention;

FIG. 10 is a diagram of an instance of accessControl according to an example embodiment of the invention;

FIG. 11 is a diagram of a table of an index with accessControl according to an example embodiment of the invention;

FIG. 12 is a diagram of an instance with access control policy information specified for the instance according to an example embodiment of the invention;

FIG. 13 is a diagram of a table of an index with access control information according to an example embodiment of the invention; and FIG. 14 illustrates a flowchart for generating a data model of a cloud system according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

Additionally, as referred to herein, serialization may denote the writing of data using a particular syntax, so that the data may be interpreted correctly by a device or machine.

Also, as referred to herein, a cloud system may, but need not, denote a system that utilizes computer resources that are available across networks (e.g., wide area networks) using Create, Read, Update, Delete (CRUD) and search APIs as well as any other suitable APIs.

Also, as referred to herein, an instance of data or an instance of the type may be a data payload that is structured according to a type definition and in conformance with the syntax described by a cloud system. Such an instance(s) may be validated against a data model describing the type.

Additionally, as referred to herein, a development environment may be an instance of a cloud system that may be used by developers and testers during a development phase of an application (app)/service requiring the cloud system.

Moreover, as referred to herein, a production environment may be an instance of a cloud system in which a user's data of an app/service requiring the cloud system may be stored.

FIG. 2 illustrates a generic system diagram in which a device such as a mobile terminal 10 is shown in an exemplary communication environment. As shown in FIG. 2, an embodiment of a system in accordance with an example embodiment of the invention may include a first communication device (e.g., mobile terminal 10) and a second communication device 20 capable of communication with each other via a network 30. In one embodiment of the invention may further include one or more additional communication devices, one of which is depicted in FIG. 2 as a third communication device 25. In one embodiment, not all systems that employ an embodiment of the invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the invention. Furthermore, devices that are not mobile, such as servers and personal computers may also readily employ an embodiment of the invention.

The network 30 may include a collection of various different nodes (of which the second and third communication devices 20 and 25 may be examples), devices or functions that may be in communication with each other via corresponding wired and/or wireless interfaces. As such, the illustration of FIG. 2 should be understood to be an example of a broad view of certain elements of the system and not an all-inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 2, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (WiFi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as, for example, personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal as well as the second and third communication devices 20 and 25 may employ an apparatus (e.g., apparatus of FIG. 3) capable of employing an embodiment of the invention.

FIG. 3 illustrates a schematic block diagram of an apparatus according to an example embodiment of the invention. An example embodiment of the invention will now be described with reference to FIG. 3, in which certain elements of an apparatus 50 are displayed. The apparatus 50 of FIG. 3 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, an embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 3, the apparatus 50 may include or otherwise be in communication with a processor 70, a user interface 67, a communication interface 74, a memory device 76, a display 85, and a data exchange module 78. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 may store one or more applications including one or more computer instructions, software code, software instructions or the like for execution by the processor 70. The memory device 76 may also store data received (e.g., one or more instances of data (e.g., a document(s)) of an object model) from one or more network devices (e.g., of a cloud system).

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the processor 70 may be embodied as, include or otherwise control the data exchange module. The data exchange module 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the data exchange module 78, as described herein. Thus, in an example in which software is employed, a device or circuitry (e.g., the processor 70 in one example) executing the software forms the structure associated with such means.

The data exchange module 78 may facilitate exchange of data (e.g., instances of data, instances of data of a document(s), etc.) between a network device(s) (e.g., network device 90 of FIG. 4) of a cloud system (also referred to herein as cloud) and other communication devices (e.g., other apparatuses 50) of the cloud system, as described more fully below.

In an example embodiment, the data exchange module 78 may utilize JavaScript Object Notation (JSON) serialization, or any other suitable format/protocol that utilizes self-descriptive properties, to create instances of data that may be sent (e.g., via a request(s) (e.g., a Hypertext Transfer Protocol (HTTP) request(s)) to other communication devices such as a network device (e.g., network device 90 of FIG. 4) and other communication devices (e.g., other apparatuses 50). In an example embodiment, the communication devices (e.g., network device 90 of FIG. 4) receiving the instances of data (e.g., via a request(s) (e.g., a HTTP request(s)) may also utilize JSON or any other suitable format/protocol that utilizes self-descriptive properties. JSON exhibits self-descriptive properties that may be missing from some other serializations, such as, for example, Extensible Markup Language (XML).

Referring now to FIG. 4, a block diagram of an example embodiment of a network device is provided. In an example embodiment, the network device 90 (e.g., a server (e.g., communication device 20)) may be a network device of a cloud system. As shown in FIG. 4, the network device generally includes a processor 94 and an associated memory 96. The memory 96 may include volatile and/or non-volatile memory, and may store content, data and/or the like. For example, the memory 96 may store content, data, information (e.g., one or more documents, instances of data, etc.), and/or the like transmitted from, and/or received by, the network device. Also for example, the memory 96 may store client applications, instructions, and/or the like for the processor 94 to perform the various operations of the network device in accordance with an embodiment of the invention, as described herein.

The memory 96 may be an electronic storage device (for example, a computer readable storage medium) comprising gates configured to store data (for example, bits) that may be retrievable by a machine (for example, like processor 94). In some example embodiments, the memory 96 may be configured to store information, data, content, files, applications, instructions (e.g., computer instructions) or the like for enabling the network device 90 to carry out various functions in accordance with example embodiments of the invention. For instance, the memory 96 may store content, data, information, and/or the like transmitted from, and/or received by, the network device 90.

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one user input interface 95. The user input interface 95, in turn, may comprise any of a number of devices allowing the network device to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

In one embodiment, the network device 90 may be embodied as a chip or chip set. In other words, the network device 90 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The network device 90 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 94 may be embodied in a number of different ways. For example, the processor 94 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 94 may be configured to execute instructions stored in the memory 96 or otherwise accessible to the processor 94. As such, whether configured by hardware or software methods, or by a combination thereof, the processor 94 may represent an entity (e.g., physically embodied in circuitry) capable of performing operations according to an embodiment of the invention while configured accordingly. Thus, for example, when the processor 94 is embodied as an ASIC, FPGA or the like, the processor 94 may be specifically configured hardware for conducting the operations described herein. Alternatively, as another example, when the processor 94 is embodied as an executor of software instructions, the instructions may specifically configure the processor 94 to perform the algorithms and operations described herein when the instructions are executed. However, in some cases, the processor 94 may be a processor of a specific device (e.g., a network device or a mobile terminal) adapted for employing an embodiment of the invention by further configuration of the processor 94 by instructions for performing the algorithms and operations described herein. The processor 94 may include, among other things, a clock, an arithmetic logic unit (ALU) and logic gates configured to support operation of the processor 94.

In an example embodiment, the processor 94 may be embodied as, include or otherwise control the automated learning data model manager 97. The automated learning data model manager 97 may be any means such as a device or circuitry operating in accordance with software or otherwise embodied in hardware or a combination of hardware and software (e.g., processor 94 operating under software control, the processor 94 embodied as an ASIC or FPGA specifically configured to perform the operations described herein, or a combination thereof) thereby configuring the device or circuitry to perform the corresponding functions of the automated learning data model manager 97, as described below. Thus, in an example in which software is employed, a device or circuitry (e.g., the processor 94 in one example) executing the software forms the structure associated with such means. The automated learning data model manager 97 may create a data model from received items of sample data (e.g., instances of data) (e.g., data received in requests (e.g., HTTP requests))), as described more fully below.

Referring now to FIG. 5, a diagram of an example of a JSON snippet of an instance of data of type person is provided according to an example embodiment. In response to receiving (e.g., from apparatus 50) the instance of data of type person, the automated learning data model manager 97 may infer that there is a type called person in the network device 90 of the cloud system and that the type person has two properties, age and gender. The data type for age is integer (e.g., 25), whereas the data type for gender is string (e.g., male). Based in part on the inferred information, the automated learning data model manager 97 may create the data model representing type person.

Therefore, in an instance in which the JSON serialization is utilized, the automated learning data model manager 97 may derive type information from the instance data. In this regard, the automated learning data model manager 97 may utilize the self-descriptive property of JSON or any other serialization format/protocol that exhibits self-descriptive properties.

Additionally, the automated learning data model manager 97 may take advantage of the manner in which information is packaged in a request(s) such as, for example, a HTTP(s) request. For example, a HTTP request may include, but is not limited to, the following parts: the request uniform resource locator (URL); the verb of the request; the headers; and a body for a Put/Post request(s). The automated learning data model manager 97 may analyze a header that specifies a user authentication token(s). For example, in an instance in which the network device (e.g., network device 90) of the cloud system supports HTTP Basic Authentication, the Authentication HTTP Header may be present and detected by the automated learning data model manager 97 as part of a HTTP header(s). Additionally, in an instance in which the cloud system supports OAuth2 (e.g., the next evolution of the open standard for authorization protocol), the OAuth2 tokens may also be present, and detected by the automated learning data model manager 97 as part of the request (e.g., a HTTP request).

Referring to FIG. 6, a diagram illustrating a request according to an example embodiment is provided. FIG. 6 shows the request (e.g., a HTTP request) URL as /sbe/v20/Marwan:Person. Based in part on analyzing the URL and the description of the object model, the automated learning data model manager 97 may detect that the identifier (id) is Marwan and the type is Person. The automated learning data model manager 97 may also detect that the request verb is Post indicating that this is a request to create the object in the network device (e.g., network device 90) of the cloud. Additionally, based in part on analyzing the request, the authorization header and its value string may be decoded by the automated learning data model manager 97 to derive the application initiating or making the request. Moreover, the automated learning data model manager 97 may analyze the user-id header, in part, to derive user information. By analyzing the body of the request or the payload, the automated learning data model manager 97 may confirm the id and type again. Additionally, by analyzing the body of the request, the automated learning data model manager 97 may also detect that type Person has two properties such as, for example, age and gender. In the example embodiment of FIG. 6, based on analyzing the serialization (e.g., JSON serialization) of the body, the automated learning data model manager 97 may derive the data type of age to be an integer (e.g., 25) and the data type of gender to be string (e.g., male).

In an example embodiment, the automated learning data model manager 97 may perform the following. First, when providing application developers the development environment, the automated learning data model manager 97 may allow developers to immediately store/retrieve/update/delete and search instances of types without first defining the data model. In doing so, the automated learning data model manager 97 may turn off the validation of instances of data in the development environment for instances of a corresponding type until the data model is completely created by the automated learning data model manager 97. In response to the data model being completely created, the validation for the corresponding type of instance(s) may be turned back on by the automated learning data model manager 97. In this regard, the processor 94 and/or the automated learning data model manager 97 may trigger/configure the development environment to start validating received instances (e.g., instances of a type) against the data model to ensure that the received instances are valid.

Second, the automated learning data model manager 97 may specify a common index definition that captures all the operations in a network device (e.g., network device 90) of the cloud system. The index definition may be capable of capturing the following: (1) all the information associated with the instance(s), (e.g., the instance identifier (id), the instance type (type), the property names and their corresponding data types, in addition to property constraints such as enumeration and cardinality; (2) the identity of the user making the request; (3) the application(s) that is giving access to the user; (3) the operation associated with the request (e.g., post, get, search, etc.), headers information, and its parameters and their values; (4) the timestamp (ts) associated with every operation; (5) the uniform resource identifier (URI) of the request; and (6) any other suitable information.

Third, for every request received by the network device (e.g., network device 90) of the cloud system, the automated learning data model manager 97 may populate all the information associated with the request(s) as rows in the index. From an instance(s) (e.g., a JSON instance) present and detected in the payload, the automated learning data model manager 97 may derive the type, id, property names and their corresponding data types, cardinality and enumeration constraints. Then, the automated learning data model manager 97 may store (e.g., in memory 96) that as part of the index. The types included in the instance may correspond to a type definition in the data model, and the property names and their corresponding data types included in the instance(s) may be the properties associated with the type defined in the data model. The enumeration and cardinality constraints may be derived by the automated learning data model manager 97 from the instance serialization.

In an instance in which the cloud system object model defines an object for access control, the automated learning data model manager 97 may infer the access control information for the type from the inclusion of access control properties in the typed instances. For example, in an instance in which an instance of type Person includes properties defined in an access control object, the automated learning data model manager 97 may utilize the values of the access control properties to infer the access control model for this type.

Additionally, in an instance in which the developer is unaware of the cloud system type for access control, the automated learning data model manager 97 may infer the access control models from the interactions of the various users with the network device (e.g., network device 90) of the cloud system. For instance, in an instance in which all the instances are written and accessed by the same user, the automated learning data model manager 97 may determine that only the creators of the instance may update/read/delete the instance(s). Furthermore, in an instance in which the instances are created by one user and later updated and retrieved by different users, the automated learning data model manager 97 may determine that anyone may update/delete/read the instances of the type. Additionally, in an instance in which the automated learning data model manager 97 may detect that the users accessing the instances belong to a special type that defines the membership of the group, the automated learning data model manager 97 may determine that the members of the group may update/delete/read the instances.

Furthermore, in the development environment, the automated learning data model manager 97 may expose the same API(s) in the production environment. As such, in an instance in which a query is written in the production environment, the query may conform to the manner in which the query is performed against the production environment. However, in this instance, there may not be an index definition to satisfy the query yet since the data model may not be completely created. However, there may be an index that is created from capturing data of previously received requests, as described above. In response to the index being created in an instance in which a search request(s) is received by a network device (e.g., network device 90) of the cloud system, the automated learning data model manager 97 may translate the syntax of the request(s) from the syntax that conforms to the production environment into a syntax that conforms to an index definition.

In this regard, for example, to derive the indexing definition needed to support the search operation, the automated learning data model manager 97 may, in the development environment, first match the properties in the search URI to the property fields stored in the index. Then, the automated learning data model manager 97 may, in the development environment, rewrite the search URI by mapping the parameters specified in the search API request to the fields defined in the index, and may then execute the search query against the index.

Additionally, the automated learning data model manager 97 may, in the development environment, create the indexing annotation and may store the indexing annotation in a memory (e.g., memory 96) of a network device (e.g., network device 90) of the cloud system. For instance, the indexing annotation may be an instance of _type index and _id corresponding to the property that is indexed. For example, in an instance in which the search URI is/search?q=age: 5 and type=Person, the automated learning data model manager 97 may, in the development environment, translate that URI to/searchDev?q=(property=age and value=5) and (type=Person). In this regard, property, type, and value are fields defined in the index. Subsequently, the automated learning data model manager 97 may, in the development environment, create an instance of _type Index, and whose _id is Person/age/.

Fourth, in an example embodiment, after receiving input of representative data in the network device (e.g., network device) of the cloud system, the automated learning data model manager 97 may generate the data model from the data in the index. In another example embodiment, the automated learning data model manager 97 may implement or execute an algorithm or software code to generate the data model from the data in the index. In order to eliminate outdated information, the automated learning data model manager 97 may set a time period during which the data was inputted to select from in creating the data model. The time period may be set in response to receiving an indication from a user (e.g., a developer) specifying the time period. Further, in response to creating the data model, the automated learning data model manager 97 may turn the validation of the data model back on.

An example embodiment may be applicable to all cloud services that expose an object model and which utilizes a self-descriptive serialization (e.g., JSON serialization). For purposes of illustration and not of limitation, example embodiments may be illustrated with examples that utilize the Data Interchange Protocol (DIP) or any other suitable protocol. For more information regarding the Data Interchange Protocol see U.S. patent application Ser. No. 13/924, 183, entitled: Methods, Apparatuses and Computer Program Products for Facilitating a Data Interchange Protocol, the contents of which is hereby incorporated by reference in its entirety.

Typically, object models may expose few system types that are used to define other objects in the system. For example, DIP may expose Entry, Field, accessControl, and Index types. Entry may be used to define types. Field may be used to associate properties with the type. Additionally, accessControl may be used to specify the access control policies governing instances. Index may be used to specify an index property, or a property that can be used in a search URI. Since these types may be created by the object model, the types are owned by the object model or system.

The automated data learning model manager 97 may define a common index definition. In this regard, for example, as described above, the automated learning data model manager 97 may generate an index that is capable of capturing all the details associated with a request(s) (e.g., a received request(s)). The index may include, but is not limited to, the following fields: (1) timestamps (ts) utilized to capture the time associated with an operation; identifier (id) utilized to capture the identifier associated with an instance(s) (e.g., the key in a keyvalue store); type may be the type specified in an instance; property may be the property included in the instance; value may be the value of the property; datatype may be the datatype associated with the property; minimum cardinality (minCardinality) may be the minimum number that a property may occur in an object; maximum cardinality (maxCardinality) may be the maximum number that a property may occur in an object; enumeration may be a restriction on the value space of the datatype allowed by the property; reference (ref) may be set to true when the property points to another object; user may be the identity of the user making or initiating the request; application (app) may be the application acting on behalf of the user; verb is the HTTP verb associated with the request; URI may be the URI associated with the HTTP request; type-owner may be the app that is responsible for defining the type; headers associated with a HTTP request(s); and any other suitable information.

The compound fields of id, type, type-owner, and property may constitute a unique key in the index. Additionally, instances stored by apps that are not owners of the datatype may not necessarily impact the type definition. When an instance is stored in a memory (e.g., memory 96) of a network device (e.g., network device 90) of the cloud system, the automated learning data model manager 97 may check to determine whether any instances of this type have been previously stored in the memory of the network device of the cloud system. When the automated learning data model manager 97 does not find any instances, the automated learning data model manager 97 may set the type as owned by the app making/initiating the request. When the automated learning data model manager 97 finds previously existing instances, the automated learning data model manager 97 may set the type owner of the new instance to the type owner which already exists in the memory of a network device of the cloud system.

The automated learning data model manager 97 may index HTTP operations. In this regard, for example, having defined the index definition, the automated learning data model manager 97 may capture all operations (e.g., HTTP operations) against the development environments in an index(es).

Referring now to FIG. 7, a diagram of a table summarizing information captured from a request is provided according to an example embodiment. In the example embodiment of FIG. 7, the automated learning data model manager 97 may generate table 2 which summarizes the information captured from a received (e.g., received from apparatus 50) request such as, for example, the HTTP request of FIG. 6 and may populate the information in an index. In this regard, table 2 may be a sample index of data from a request (e.g., the HTTP request of FIG. 6).

In the example embodiment of FIG. 7, in response to analyzing the data of the received HTTP request of FIG. 6, the automated learning data model manager 97 may include a timestamp (e.g., is 2) in the first field of the index and instance id of Marwan in which the type of the instance is a person. In the example embodiment of FIG. 7, the automated learning data model manager 97 may include an indication in the index that the type owner is HR. Moreover, in the example embodiment of FIG. 7, the automated learning data model manager 97 may detect that HR is the app that wrote the request. Additionally, the automated learning data model manager 97 may include indications in the index of the property age with the value of age being 25 and specifying that the data type is integer. The automated learning data model manager 97 may also include indications in the index of the property gender with the value of gender being male and specifying that the data type is string. The automated learning data model manager 97 may indicate that the verb is Post in the index and there is no cardinality constraint(s) (e.g., minCardinality, maxCardinality) and no enumeration constraint(s). The automated learning data model manager 97 may also indicate in the index that the user is a cloud user and may specify the URI as well as the authorization header.

The automated learning data model manager 97 may derive a data model for the type of person to identify what type of information exists for the type of person (e.g., Marwan) in the cloud system based on the index of table 2 of FIG. 7. However, there may not yet be enough information received relating to accessControl to generate a complete data model that may be usable for all received requests.

In an example embodiment, the automated learning data manager 97 may derive access control information. The automated learning data manager 97 may derive the access control information in response to receiving another request(s) (e.g., HTTP request(s)) from a communication device (e.g., apparatus 50). The received request may include information defining access control properties that may be included in an instance(s) of data.

Referring now to FIG. 8, a diagram of an instance that may be utilized to define an accessControl type is provided according to an example embodiment. In this example embodiment of FIG. 8, the automated learning data model manager 97 may, for example, receive the instance in FIG. 8 and may receive the instance in a request as described above and may analyze the data of the instance to define the accessControl type.

The example embodiment of FIG. 8 shows an instance 12345 of type accessControl. The instance includes three distinct values for properties such as, for example, read, write, and delete. That is, the values for properties read, write, and delete may be one of the following: private, public, or group. FIG. 8 also shows that properties read, write, and delete have maxCardinality of three, since the serialization associated with the property cardinality is utilized by the automated learning data model manager 97. For instance, the object is repeated three times as denoted by the information in the three pair of brackets (e.g., { }) in FIG. 8.

Referring now to FIG. 9, a diagram of a table illustrating an example of an index according to an example embodiment is provided. In the example embodiment of FIG. 9, the automated learning data model manager 97 may generate the index (e.g., index data for accessControl) of table 3 in response to analyzing data of the instance of FIG. 8. The data of the index of FIG. 9 may include information indicating cardinality and enumeration constraints as well as other information.

In response to analyzing the data of the instance of FIG. 8, the automated learning data model manager 97 may specify in the index of table 3 of FIG. 9, that the timestamp is 1, that the type of the id of the instance is 12345 and that the type of instance is accessControl. Additionally, the automated learning data model manager 97 may specify in the index of table 3 that the properties include read, write and delete which are private or public in the index of table 3. In some example embodiments, the properties read, write, delete may be designated as group in the index of table 3. Moreover, the automated learning data model manager 97 may indicate that the datatype field is string and that the type owner is system. In an example embodiment, designation of the type owner as system may denote that only the owner/originator of the type accessControl may specify information of the accessControl such that another user may be unable to change or alter these accessControl instances in the cloud system.

The automated learning data model manager 97 may also specify in the index of table 3 that the properties read, write, delete have a maximum cardinality (maxCardinality) of three since the object is repeated three times in the instance of FIG. 8 as described above. In addition, the automated learning data model manager 97 may specify in the index of table 3 that the value of the properties read, write and delete are enumerated denoting that the properties of read, write and delete may be one of three values such as, for example, private, public or group. In this manner, the property value of read, write, and delete is constrained to be one of three values public, private, or group. The automated learning data model manager 97 may also specify in the index of table 3 that the verb is Post.

In an instance in which it may be undesirable to convey the cardinality and enumeration restrictions about properties read, write, and delete, the automated learning data model manager 97 may utilize and/or analyze the instance serialization of accessControl shown in FIG. 10. In an example embodiment, the instance serialization of FIG. 10 may be received in another request (e.g., a HTTP request) from a communication device (e.g., apparatus 50). As shown in FIG. 10, there is not any information included in the accessControl instance denoting cardinality and enumeration constraints of the properties read, write and delete.

Referring now to FIG. 11, a diagram illustrating a table of an index with accessControl information is provided according to an example embodiment. In the example embodiment of FIG. 11, the automated learning data model manager 97 may generate the index of table 4 in response to analyzing the accessControl instance of FIG. 10.

The index of table 4 shows a timestamp of 1 and that the id is instance 12345 of type accessControl. The instance may include three distinct values for properties read, write, and delete and the values of the properties read, write and delete have no constraint(s). The index of table 4 indicates that the data types of the values of the properties read, write and delete are strings and that the type-owner for accessControl is system. In this regard, accessControl is a type provided by the system, or by the object model, meaning that all other types defined by applications may make use of the accessControl to specify access control policies. As such, the automated learning data model manager 97 may indicate in the index of table 4 that the app is system. The automated learning data model manager 97 may also indicate that the URI verb is Post and that the user is cloudUser. A user (e.g., developer) responsible for creating the accessControl data model may have used the development environment to create the accessControl data model. In this regard, once the accessControl data model has been created, the user (e.g., a developer) may configure the development environment to validate instances of accessControl type. This may prohibit the inclusion of any instances of the system types that do not conform to the data model.

Referring now to FIG. 12, a diagram illustrating an instance with access control policies is provided according to an example embodiment. In the example embodiment of FIG. 12, the automated learning data model manager 97 may include the instance of FIG. 5 with access control policies specified for the instance. These access control polices may be derived by the automated learning data model manager 97 from the information associated with the accessControl instance of FIG. 8 and/or the corresponding index in table 3 of FIG. 9.

As such, the information analyzed from the instance of FIG. 5 associated with URI Marwan and the information analyzed from the accessControl instance in the index of table 3 may now be combined and included in the data model by the automated learning data model manager 97. In other words, in this regard, the automated learning data model manager 97 may have additional information that is written in the data model being developed by the automated learning data model manager 97 which may be utilized in response to receipt of another request (e.g., a request from one or more apparatuses 50).

In the example embodiment of FIG. 12, the instance with the identifier Marwan/Marwan is of type person and of type accessControl. The instance of FIG. 12 indicates that the instance Marwan/Marwan is available for everyone to read. However, the instance Marwan/Marwan may only be updated or deleted by the person who created the instance since the write property is private and the delete property is private.

Referring now to FIG. 13, a diagram of a table of an index is provided according to an example embodiment. In the example embodiment of FIG. 13, the automated learning data model manager 97 may generate the index of table 5 in response to analyzing the data of the instance of FIG. 12. In the example embodiment of FIG. 13, the automated learning data model manager 97 may specify in the index that the type owner is System for rows whose type is accessControl. On the other hand, the automated learning data model manager 97 may specify that the type owner is HR for rows whose type is Person.

In the example embodiment of FIG. 13, the first two rows of the index have a timestamp of 2 associated with instance Marwan and properties age and gender and the next two rows of the index have another timestamp of 3 associated with the instance Marwan having properties age and gender. In the index of table 5 of FIG. 13, the instance Marwan has a type of person and also has an accessControl type. However, the application (app) that is making/initiating the request is HR, which is not the System app, as indicated in the index of table 5 of FIG. 13. In other words, the app HR is making/initiating the statements associated with the index. As such, the entries in the last three rows of the index of table 5 specify the accessControl policy on the app HR making/initiating the statements.

In an example embodiment, the automated learning data model manager 97 may derive access controls settings from interaction patterns of a user. With regards to the above described techniques it may be beneficial for a user (e.g., developer) to be aware of the type for accessControl. This may be viable for the user who is familiar with the cloud system. However, a user (e.g., developer) who is developing in the cloud system for the first time, may be unaware of the existence of this system type for accessControl. In this regard, the automated learning data model manager 97 may, in the development environment, be configured to determine the access control annotations from the interaction patterns of the users (e.g., developers) interacting with the cloud system.

For example, in an instance in which a user initiates a request (e.g., using a Put, Get, Delete, or Post HTTP request) that is provided by a communication device (e.g., apparatus 50) to a network device (e.g., network device 90) of the cloud system to retrieve an instance of data, the automated learning data model manager 97 of the network device may fulfill the request.

The automated learning data model manager 97 may compare the credentials of the user that submitted the request with the credentials of the creators of the retrieved instance in the case of an Update, Delete, or Get request.

In an instance in which the automated learning data model manager 97 detects that the credentials of the user submitting the request is different from the credentials of the user(s) that created the retrieved instance, the automated learning data model manager 97 may derive the access control policies on the instance depending on the exact operation. For example, in an instance in which the automated learning data model manager 97 determines that the request is a Get request, the automated learning data model manager 97 may determine that the access control policy is public.

Additionally, in an instance in which the automated learning data model manager 97 may determine that the request is a Delete request, the automated learning data model manager 97 may determine that the access control policy for the Delete request is public.

In an instance in which the automated learning data model manager 97 may determine that the request is an Update request, the automated learning data model manager 97 may determine that the access control policy for Update request is public.

Furthermore, in an instance in which the automated learning data model manager 97 detects the credentials of the user submitting the request to be the same as the credentials of a user that created the retrieved instance, the automated learning data model manager 97 may determine that the access control policy for the request is private.

In response to the automated learning data model manager 97 determining the access control policy, the automated learning data model manager 97 may create the annotation for access control in an index. In other words, the automated learning data model manager 97 may create the instance of type accessControl in the development environment, therefore alleviating the need for a user (e.g., developer) to create the instance of type accessControl.

In an example embodiment, the automated learning data model manager 97 may analyze generated index data to generate data model information. For example, with the use of the development environment, the automated learning data model manager 97 may have a sufficient amount of data in an index to generate the data model. In one example embodiment, the automated learning data model manager 97 may detect that sufficient information (e.g., a threshold amount of information) is captured to generate a complete data model in response to detecting or deriving access control policy information (e.g., accessControl type information).

In order to exclude outdated instances of data and test instances, the automated learning data model manager 97 may set a time frame that corresponds to a period of time in the index from which to generate the data model. In an example embodiment, the automated learning data model manager 97 may set the time frame in response to receipt of an indication of the time frame from a user (e.g., developer). In addition, the automated learning data model manager 97 may optionally, specify user information such that the automated learning data model manager 97 may retrieves information from the index corresponding to the specified user.

To analyze the generated index data to create the data model information, the automated learning data model manager 97 may read all data from the index between the start time and end time of the specified time frame. For every row retrieved from the index in an instance in which the automated learning data model manager 97 determines that the value of type owner (e.g., HR) is equal to the value of app (e.g., HR), the automated learning data model manager 97 may derive data model type information. In this regard, the automated learning data model manager 97 may create a type corresponding to the value of the field type and may create the property corresponding to the value of the field property and associate the property with the previously created type.

Additionally, the automated learning data model manager 97 may set the data type of the property to the value of the field datatype and may set any enumeration and cardinality constraints of the property to the value of the enumeration and minCardinality and/or maxCardinality fields respectively.

On the other hand, in an instance in which the value of the type is not equal to the value of app for every row retrieved from the index, the automated learning data model manager 97 may create one or more policy annotations in the data model. The annotations may be statements in the data model that represent policy information as opposed to type definitions. The annotations may govern the processing of instances.

Additionally, the automated learning data model manager 97 may retrieve a property and its value corresponding to the row. In an instance in which the value is neither null nor empty, the automated learning data model manager 97 may write the annotations with the specified value to the data model. Referring to table 5 of FIG. 13, the value of property read is public, for example. As such, in this example, the policy for access control is everyone. Subsequently, the automated learning data model manager 97 may copy the annotation(s) from the index into the data model being defined. The automated learning data model manager 97 may perform similar tasks for properties write and delete. For instance, in table 5 of FIG. 13, the value of property write and property delete is private. As such, in this example, the policy for access control to write and delete is restricted to the creator of the instance. The automated learning data model manager 97 may copy the annotation(s) associated with properties write and delete from the index into the data model being defined.

In an instance in which the automated learning data model manager 97 may determine that a value is null or empty, or if the instance for the system type does not exist in the index, the automated learning data model manager 97 may run or execute the data model.

Subsequently, the automated learning data model manager 97 may set the enumeration and cardinality constraints of the property in the data model, to the value of the enumeration and minCardinality and/or maxCardinality fields respectively.

In response to the data model being generated by the automated learning data model manager 97, the automated learning data model manager 97 may turn on validation functionality to trigger/configure the development environment to start validating received instances (e.g., instances of a type) against the data model to ensure that the received instances are valid. In an example embodiment, the received instances may be sent from one or more communication devices (e.g., apparatuses 50). In an instance in which the processor 94 and/or the automated learning data model manager 97 determines that an instance(s) received from a communication device(s) (e.g., apparatus(es) 50) is invalid, an error message may be generated by the processor 94 and/or the automated learning data model manager 97 and may be sent to the communication device(s) (e.g., apparatus(es) 50).

As described above, in an example embodiment, the automated learning data model manager 97 may alleviate the need for the data model to be developed against the development environment beforehand. Rather, in an example embodiment, the automated learning data model manager 97 may make it possible for a network device of the cloud system to automatically create the data model. Furthermore, in an example embodiment, the automated learning data model manager 97 may make it unnecessary for a user (e.g., a developer) to learn about system types beforehand. The automatic generation of the data model by the automated learning data model manager 97 may make a user's (e.g., developer's) job easier and may save time and money.

Additionally, in an example embodiment, the automated learning data model manager 97 may expose the same APIs in the development environment as the production environment, as described above. As such, software code may not necessarily change when moving from the development environment to the production environment.

Furthermore, in an alternative example embodiment, the automated learning data model manager 97 may allow for flexibility as to the manner in which to implement the approaches described above. For example, the automated learning data model manager 97 may, in the development environment, include/log all details to log files. The log files may be copied to an analytics cluster by the automated learning data model manager 97. Thereafter, the log files may be analyzed, by the automated learning data model manager 97 to populate the index. Subsequently, the automated learning data model manager 97 may analyze the populated index to generate the data model.

Referring now to FIG. 14, an example embodiment of a flowchart for generating a data model of a cloud system is provided. At operation 1400, an apparatus (e.g., network device 90) may include means, such as the automated learning data model manager 97, the processor 94 and/or the like, for receiving one or more requests from one or more communication devices (e.g., apparatuses 50) or one or more applications (e.g., app HR). At operation 1405, the apparatus (e.g., network device 90) may include means, such as the automated learning data model manager 97, the processor 94 and/or the like, for analyzing one or more instances of data of the requests, in part, to generate at least one index (e.g., the index of table 5 of FIG. 13).

At operation 1410, the apparatus (e.g., network device 90) may include means, such as the automated learning data model manager 97, the processor 94 and/or the like, for automatically generating a data model, in a development environment, based at least in part on the data in the index. The data model may include one or more definitions defining valid types of instances of data designated for validation of one or more received instances of data (e.g., other instances of data received from a communication device(s) (e.g., apparatus(es) 50) or application(s) (e.g., app HR). Optionally, at operation 1415, the apparatus (e.g., network device 90) may include means, such as the automated learning data model manager 97, the processor 94 and/or the like, for activating (e.g., turning on) validation of one or more types of instances of data in the development environment in response to detection of the automatically generated data model.

It should be pointed out that FIG. 14 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 96) and executed by a processor (e.g., processor 94, automated learning data model manager 97). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the method of FIG. 14 above may comprise a processor (e.g., the processor 94, the automated learning data model manager 97) configured to perform some or each of the operations (1400-1415) described above. The processor may, for example, be configured to perform the operations (1400-1415) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (1400-1415) may comprise, for example, the processor 94 (e.g., as means for performing any of the operations described above), the automated learning data model manager 97 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving one or more requests from one or more communication devices or one or more applications, a request of the one or more requests associated with requester credentials;
   analyzing one or more instances of data of the requests based at least in part on a comparison of the requester credentials associated with the request and credentials of a creator of the one or more instances of data;
   generating at least one index based at least in part on the analysis of the one or more instances of data of the requests, wherein the at least one index comprises at least one instance of type access control determined based at least in part on a result of the comparison;
   automatically generating, via a processor, a data model, in a development environment, based at least in part on the data in the index, the data model comprises one or more definitions defining access control for instances of data designated for validation of one or more received instances of data; and
   validating the one or more received instances of data within the development environment based at least in part on the generated data model and in response to detecting the generated data model.

2. A method according to claim 1 further comprising specifying a time period for retrieval of a subset of the data, in the index, that was included in the index during the time period.

3. A method according to claim 1, wherein at least one of the one or more requests is an Update, Delete, or Get request.

4. A method according to claim 1 further comprising, in response to determining that the requester credentials are different from the credentials of the creator of the one or more instances of data, deriving access control for instances of data depending on an operation of the request.

5. A method according to claim 1 further comprising, in response to determining that the requester credentials are similar to the credentials of the creator of the one or more instances of data, determining access control for instances of data of the requests is private.

6. A method according to claim 1 wherein validating the one or more received instances of data received from the one or more communication devices or the one or more applications is based in part on analyzing one or more definitions of the generated data model to determine whether the received instances of data comply with the definitions of the generated data model.

7. A method according to claim 1, wherein prior to validating, the method further comprises:
   activating validation of one or more types of instances of data in the development environment in response to detection of the generated data model.

8. A method according to claim 1, wherein the access control is selected from a group consisting of public, private, and group access control.

9. An apparatus comprising:
   at least one processor; and
   at least one non-transitory memory including computer program code, the at least one memory and the computer program code configured to, with the at least one processor, cause the apparatus to perform at least the following:
   receive one or more requests from one or more communication devices or one or more applications, a request of the one or more requests associated with requester credentials;
   analyze one or more instances of data of the requests based at least in part on a comparison of the requester credentials associated with the request and credentials of a creator of the one or more instances of data;
   generate at least one index based at least in part on the analysis of the one or more instances of data of the requests, wherein the at least one index comprises at least one instance of type access control determined based at least in part on a result of the comparison;
   automatically generate a data model, in a development environment, based at least in part on the data in the index, the data model comprises one or more definitions defining access control for instances of data designated for validation of one or more received instances of data; and
   validate the one or more received instances of data within the development environment based at least in part on the generated data model and in response to detecting the generated data model.

10. An apparatus according to claim 9, wherein the at least one memory and the computer program code are further configured to, with the at least one processor, cause the apparatus to perform at least:
    specify a time period for retrieval of a subset of the data, in the index, that was included in the index during the time period.

11. An apparatus according to claim 9, wherein at least one of the one or more requests is an Update, Delete, or Get request.

12. An apparatus according to claim 9, wherein the at least one memory and the computer program code are further configured to, with the at least one processor, cause the apparatus to perform at least:

in response to determining that the requester credentials are different from the credentials of the creator of the one or more instances of data, derive access control for instances of data depending on an operation of the request.

13. An apparatus according to claim 9, wherein the at least one memory and the computer program code are further configured to, with the at least one processor, cause the apparatus to perform at least:
in response to determining that the requester credentials are similar to the credentials of the creator of the one or more instances of data, determine access control for instances of data of the requests is private.

14. An apparatus according to claim 9, wherein to validate the one or more instances of received data received from the one or more communication devices or the one or more applications, the at least one memory and the computer program code are further configured to, with the at least one processor, cause the apparatus to perform at least analyze one or more definitions of the generated data model to determine whether the received instances of data comply with the definitions of the generated data model.

15. An apparatus according to claim 9, wherein prior to validating the at least one memory and the computer program code are further configured to, with the at least one processor, cause the apparatus to perform at least:
activate validation of one or more types of instances of data in the development environment in response to detection of the generated data model.

16. An apparatus according to claim 9, wherein the access control is selected from a group consisting of public, private, and group access control.

17. A computer program product comprising at least one non-transitory computer-readable storage medium having computer-readable program code portions stored therein, the computer-readable program code portions comprising:
program code instructions configured to receive one or more requests from one or more communication devices or one or more applications, a request of the one or more requests associated with requester credentials;
program code instructions configured to analyze one or more instances of data of the requests based at least in part on a comparison of the requester credentials associated with the request and credentials of a creator of the one or more instances of data;
program code instructions configured to generate at least one index based at least in part on the analysis of the one or more instances of data of the requests, wherein the at least one index comprises at least one instance of type access control determined based at least in part on a result of the comparison;
program code instructions configured to automatically generate a data model, in a development environment, based at least in part on the data in the index, the data model comprises one or more definitions defining access control for instances of data designated for validation of one or more received instances of data; and
program code instructions configured to validate the one or more received instances of data within the development environment based at least in part on the generated data model and in response to detecting the generated data model.

18. A computer program product according to claim 17, wherein the computer-readable program code portions comprise:
program code instructions configured to specify a time period for retrieval of a subset of the data, in the index, that was included in the index during the time period.

19. A computer program product according to claim 17, wherein the computer-readable program code portions comprise:
program code instructions configured to in response to determining that the requester credentials are different from the credentials of the creator of the one or more instances of data, derive access control for instances of data depending on an operation of the request.

20. A computer program product according to claim 17, wherein the computer-readable program code portions comprise:
program code instructions configured to, in response to determining that the requester credentials are similar to the credentials of the creator of the one or more instances of data, determine access control for instances of data of the requests is private.

* * * * *